United States Patent [19]

Stahl et al.

[11] Patent Number: 4,876,780
[45] Date of Patent: Oct. 31, 1989

[54] DOUBLE WALL VACUUM TUBING AND METHOD OF MANUFACTURE

[75] Inventors: Charles R. Stahl, Scotia, N.Y.; Michael A. Gibson; Christian W. Knudsen, both of Houston, Tex.

[73] Assignee: Carbotek, Inc., Houston, Tex.

[21] Appl. No.: 264,351

[22] Filed: Oct. 31, 1988

[51] Int. Cl.$^4$ .............................................. B23P 15/00
[52] U.S. Cl. ..................... 29/157.4; 29/446; 29/527.1; 29/DIG. 45; 138/177
[58] Field of Search ..................... 29/157.4, 446, 452, 29/527.1, DIG. 45; 165/135, 511; 53/403, 405, 408, 409

[56] References Cited

U.S. PATENT DOCUMENTS

| | | | |
|---|---|---|---|
| 4,451,966 | 6/1984 | Lee | 29/157.4 |
| 4,488,344 | 12/1984 | McCurley | 29/157.4 |
| 4,577,381 | 3/1986 | Sato et al. | 29/157.4 |

*Primary Examiner*—Timothy V. Eley
*Attorney, Agent, or Firm*—Neal J. Mosely

[57] ABSTRACT

An evacuated double wall tubing is shown together with a method for the manufacture of such tubing which includes providing a first pipe of predetermined larger diameter and a second pipe having an O.D. substantially smaller than the I.D. of the first pipe. An evacuation opening is then in the first pipe. The second pipe is inserted inside the first pipe with an annular space therebetween. The pipes are welded together at one end. A stretching tool is secured to the other end of the second pipe after welding. The second pipe is then prestressed mechanically with the stretching tool an amount sufficient to prevent substantial buckling of the second pipe under normal operating conditions of the double wall pipe. The other ends of the first pipe and the prestressed second pipe are welded together, preferably by explosion welding, without the introduction of mechanical spacers between the pipes. The annulus between the pipes is evacuated through the evacuation opening, and the evacuation opening is finally sealed. The first pipe is preferably of steel and the second pipe is preferably of titanium. The pipes may be of a size and wall thickness sufficient for the double wall pipe to be structurally load bearing or may be of a size and wall thickness insufficient for the double wall pipe to be structurally load bearing, and the double wall pipe positioned with a sliding fit inside a third pipe of a load-bearing size.

35 Claims, 5 Drawing Sheets

FIG.6

DOUBLE WALL VACUUM TUBING AND METHOD OF MANUFACTURE

BACKGROUND OF THE INVENTION

1. Field of the Invention

This invention relates generally to evacuated double wall tubing and methods of manufacture of such tubing.

2. Brief Description of the Prior Art

Double wall tubing or pipe is known for use in heat exchange operations and in insulating hot or cold liquids being conducted through such pipe.

There are a number of patents which disclose various types of double wall pipe or tubing and methods of manufacture.

Walsh U.S. Pat. No. 291,655 discloses double wall tubing or pipe having an annular space filled with a heat retentive material for heating rail cars at times when steam is not available.

Trucano U.S. Pat. No. 1,140,633 discloses double wall tubing or pipe which is evacuated to provide heat insulation and having a double wall coupling which is evacuated to prevent loss of heat at the coupling of the tubes together.

Adorjan U.S. Pat. No. 3,850,714 discloses coaxial tubes with the annular space filled with blown polyurethane foam.

These coaxial tubings or pipes are used for transporting hot liquids or gases.

McStravick U.S. Pat. Nos. 4,396,211, 4,444,420 and 4,480,371 disclose double wall tubing or pipe for use in thermally enhanced oil recovery in which the inner pipe is prestressed and the annulus filled with insulating material.

Stephenson U.S. Pat. Nos. 4,332,401 and 4,415,184, Stalder U.S. Pat. No. 4,340,245, and Hutchinson U.S. Pat. Nos. 4,477,106 and 4,453,570 discloses other types of double wall tubing or pipe where the inner tube is prestressed and the annulus supported by solid insulation.

Holbrook U.S. Pat. Nos. 4,470,188 and 4,538,337 disclose the use of techniques of heating or of drawing the inner tubing to prestress a double wall tubing or pipe.

Berti U.S. Pat. No. 4,560,188, Bonjour U.S. Pat. No. 4,609,373, and Neal U.S. Pat. No. 4,579,373 disclose various double wall tubing or pipe assemblies and special couplings therefor.

These patents do not deal with the problems of fabricating and evacuating double wall tubing where the inner tube or pipe is prestressed before the annulus is evacuated. Also, these patents do not address the problems of forming double wall tubing or pipe where the inner tubing or pipe is of titanium.

DeMaris U.S. Pat. No. 3,331,121 discloses explosion welding or bonding techniques for joining titanium to steel.

Doherty U.S. Pat. No. 3,645,435 discloses explosion welding or bonding techniques for forming end lap joints in tubing, no particular metal being specified.

The present invention is distinguished over the prior art in general, and these patents in particular by an evacuated double wall tubing made by a method which includes providing a first pipe of predetermined larger diameter and a second pipe having an O.D. substantially smaller than the I.D. of the first pipe. An evacuation opening is then formed in the first pipe. The second pipe is inserted inside the first pipe with an annular space therebetween. The pipes are welded together at one end. A stretching tool is secured to the other end of the second pipe after welding. The second pipe is then prestressed mechanically with the stretching tool an amount sufficient to prevent substantial buckling of the second pipe under normal operating conditions of the double wall pipe. The other ends of the first pipe and the prestressed second pipe are welded together, preferably by explosion welding, without the introduction of mechanical spacers between the pipes. The annulus between the pipes is evacuated through the evacuation opening, and the evacuation opening is finally sealed. The first pipe is preferably of steel and the second pipe is preferably of titanium. The pipes may be of a size and wall thickness sufficient for the double wall pipe to be structurally load bearing or may be of a size and wall thickness insufficient for the double wall pipe to be structurally load bearing, and the double wall pipe positioned with a sliding fit inside a third pipe of a load-bearing size.

SUMMARY OF THE INVENTION

It is therefore an object of the present invention to provide a new and improved, evacuated double wall pipe for use in transporting hot or cold fluids.

It is another object of this invention is to provide a new and improved, evacuated double wall pipe for use in transporting hot or cold fluids in which the inner pipe is prestressed mechanically.

Another object of this invention is to provide a new and improved, evacuated double wall pipe for use in transporting hot or cold fluids in which the inner pipe is prestressed mechanically sufficiently to prevent buckling of the inner pipe under normal operating conditions.

Another object of this invention is to provide a new and improved, evacuated double wall pipe for use in transporting hot or cold fluids in which the inner pipe is prestressed mechanically sufficiently to prevent buckling of the inner pipe under normal operating conditions and the annulus between the pipes evacuated and subsequently sealed.

Still another object of this invention is to provide a new and improved, evacuated double wall pipe for use in transporting hot or cold fluids, one pipe being of steel and the other pipe being of titanium, in which the inner pipe is prestressed mechanically sufficiently to prevent buckling of the inner pipe under normal operating conditions and the annulus between the pipes evacuated and subsequently sealed.

Still another object of this invention is to provide a new and improved, evacuated double wall pipe for use in transporting hot or cold fluids, one pipe being of steel and the other pipe being of titanium, in which the inner pipe is prestressed mechanically sufficiently to prevent buckling of the inner pipe under normal operating conditions, the ends of the pipes being explosion welded together, and the annulus between the pipes evacuated and subsequently sealed.

A further object of this invention is to provide an improved method of manufacture of an evacuated double wall pipe for use in transporting hot or cold fluids in which the inner pipe is prestressed mechanically and subsequently evacuated.

A further object of this invention is to provide an improved method of manufacture of an evacuated double wall pipe for use in transporting hot or cold fluids in which the inner pipe is prestressed mechanically sufficient to prevent buckling of the inner pipe under normal operating conditions and subsequently evacuated.

A still further object of this invention is to provide an improved method of manufacture of an evacuated double wall pipe for use in transporting hot or cold fluids in which the inner pipe is prestressed mechanically sufficient to prevent buckling of the inner pipe under normal operating conditions and the annulus between the pipes is evacuated and subsequently sealed.

Still another object of this invention is to provide an improved method of manufacture of an evacuated double wall pipe for use in transporting hot or cold fluids, one pipe being of steel and the other pipe being of titanium, in which the inner pipe is prestressed mechanically sufficiently to prevent buckling of the inner pipe under normal operating conditions, the ends of the pipes are explosion welded together, and the annulus between the pipes evacuated and subsequently sealed.

Other objects of the invention will become apparent from time to time throughout the specification and claims as hereinafter related.

The above noted objects and other objects of the invention are accomplished by a novel evacuated double wall pipe made by a method which includes providing a first pipe of predetermined larger diameter and a second pipe having an O.D. substantially smaller than the I.D. of the first pipe. An evacuation opening is then formed in the first pipe. The second pipe is inserted inside the first pipe with an annular space therebetween. The pipes are welded together at one end. A stretching tool is secured to the other end of the second pipe after welding. The second pipe is prestressed mechanically with the stretching tool an amount sufficient to prevent substantial buckling of the second pipe under normal operating conditions of the double wall pipe. The other ends of the first pipe and the prestressed second pipe are welded together, preferably by explosion welding, without the introduction of mechanical spacers between the pipes. The annulus between the pipes is evacuated through the evacuation opening, and the evacuation opening is finally sealed. The first pipe is preferably of steel and the second pipe is preferably of titanium. The pipes may be of a size and wall thickness sufficient for the double wall pipe to be structurally load bearing or may be of a size and wall thickness insufficient for the double wall pipe to be structurally load bearing, and the double wall pipe positioned with a sliding fit inside a third pipe of a load-bearing size.

DESCRIPTION OF ONE PREFERRED EMBODIMENT

In high temperature steam injection processes for enhanced recovery of oil, it is necessary to convey high pressure, high temperature steam several thousand feet into the ground without substantial loss of energy. One process of this type is shown in Stahl et al U.S. Pat. No. 4,694,907. The use of insulated pipe for this purpose gives rise to problems because of the space taken up by the insulation. It is desirable to provide an evacuated, double wall pipe for this purpose because of the saving in space required for insulation of the steam flowing through the pipe. Evacuated, double wall pipe has been suggested for other purposes but has had problems of corrosion and buckling of the pipe walls under the conditions of operation.

This invention provides a new and improved method of manufacture of double wall, evacuated pipe which is specially adapted to transmission of high temperature, high pressure steam and also for transmission of cryogenic liquids. In this double wall pipe, a preferred embodiment uses titanium pipe as one of the components of the doubl wall structure. This takes advantage of the low modulus and low coefficient of expansion which reduces thermal stresses. Titanium is also substantially impervious to hydrogen diffusion and thus avoids the degradation of vacuum which occurs when hydrogen produced by corrosion of steel enters the evacuated space.

A preferred embodiment of the invention uses a double wall structure of titanium and of steel, although both walls could be of titanium or steel in certain applications. For maximum efficiency and economy of materials, the inner wall of the double wall pipe should be of titanium and the outer wall should be of steel. This raises the problem that the inner wall of titanium may buckle under compressive loading generated by thermal expansion or by the weight of the string of pipe. Mechanical prestressing of the inner, titanium pipe provides a means for avoiding the problem of compressive buckling.

The joining of titanium pipe to a load bearing steel pipe to make a vacuum tight closure is very difficult where the inner pipe is in a stretched condition. Conventional welding and other high temperature joining methods, such as electron beam welding, laser welding and diffusion welding are not satisfactory because of the formation of brittle intermetallics. While lower temperature brazing techniques can be used to join titanium to steel, the high affinity of titanium for oxygen requires the use of a low oxygen environment or a vacuum. These requirements are difficult to meet when fabricating 30 foot pipe sections. The solution to the problem of joining titanium to steel in this process was found in the technique of explosion welding which has been used in other applications of titanium.

Figure 1:
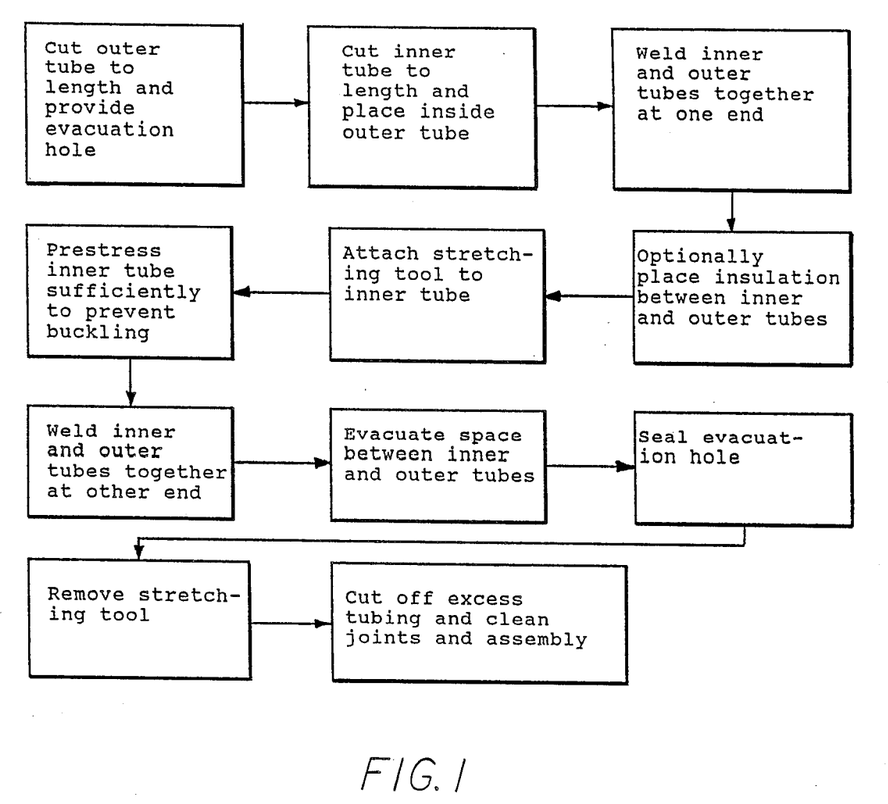
FIG. 1 is a flow diagram illustrating a simplified version of an improved method for manufacturing evacuated double wall pipe.

In FIG. 1 of the drawing, there is shown a simplified flow chart for the method of forming evacuated double wall pipe according to this invention. An outer tube or pipe is provided and cut to length and an evacuation hole is drilled or otherwise formed therein. The outer tube has an O.D. of the size of a conventional earth drill pipe and an I.D. sized to receive the inner pipe. The outer pipe is preferably steel of a diameter and wall thickness sufficient to be load bearing under the conditions of use. An inner tube or pipe is provided which is a thin wall tube, preferably of titanium, having an O.D. which is substantially smaller than the I.D. of the outer pipe.

The inner pipe is inserted inside the outer pipe and the pipes welded together at one end by explosion welding. Thermal and radiation insulating material is inserted into the annular space between the inner and outer pipes. The inner pipe is threaded at the end opposite the first weld. A stretching tool is threaded on the threaded end of the inner pipe and operated mechanically or hydraulically to prestress the inner pipe sufficiently to prevent any buckling of the inner pipe under the normal conditions of operation.

The prestressed inner pipe is then explosion welded to the outer, supporting pipe. A vacuum is pulled through the evacuation tube and opening and the opening is sealed. The stretching tool is removed from the threaded end of the inner pipe and excess pipe or tubing is cut off and the double wall pipe assembly checked for leakage and cleaned in preparation for storage and use.

Figure 2:
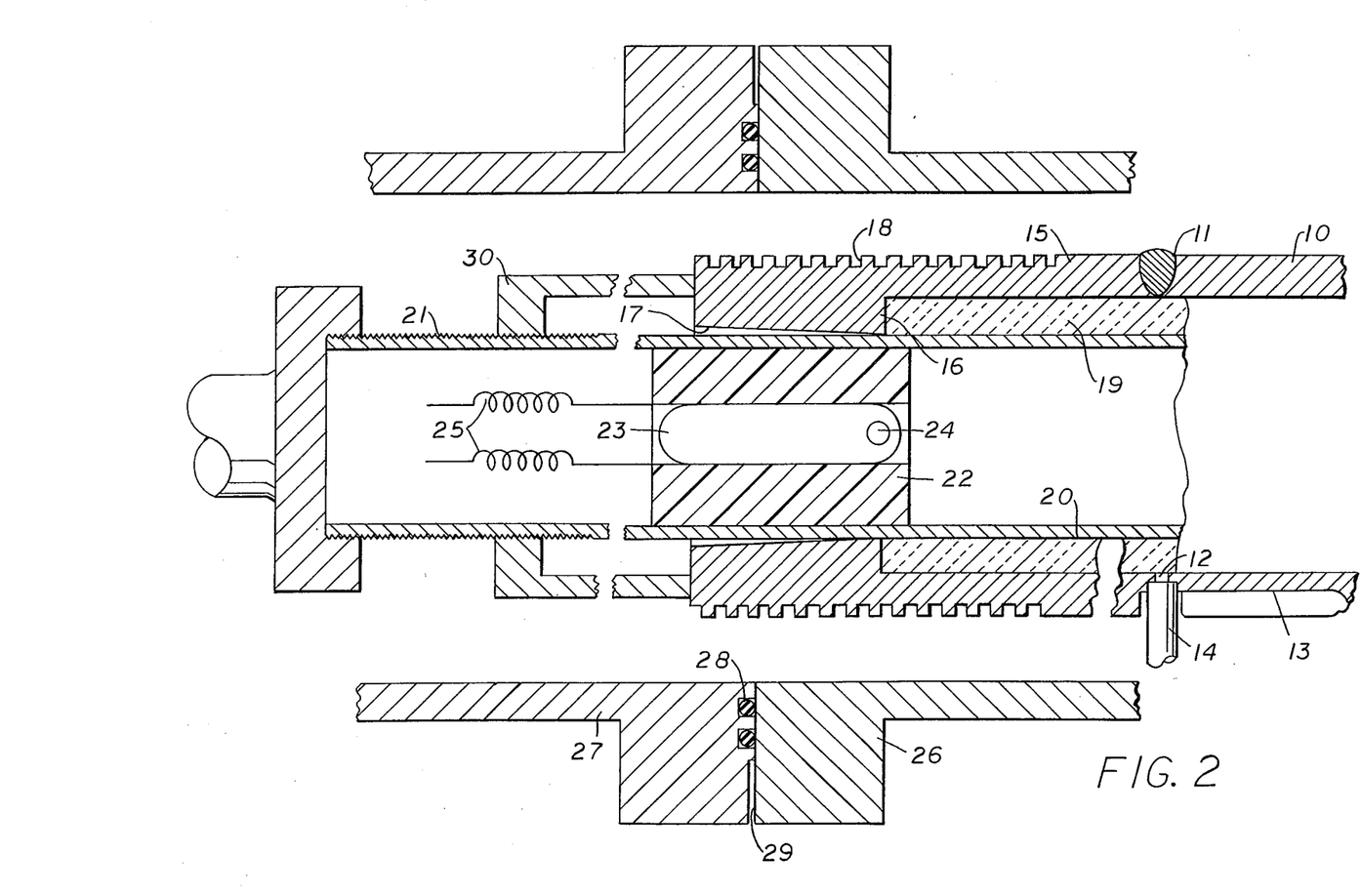
FIG. 2 is a longitudinal broken section of the double wall pipe and associated apparatus used in preparation.

In FIG. 2, there is shown a fragmentary, partial section of double wall pipe in the process of manufacture, illustrating various steps in the manufacturing and the apparatus used.

The method of manufacture and apparatus will be described for the manufacture of double wall pipe in standard drill pipe lengths of 30 ft. The dimensions given are for a particular pipe size and obviously could and would be varied appropriately for manufacture of other pipe sizes. The outer pipe 10 is of steel and is typically about $2\frac{7}{8}''$ O.D. and has a wall thickness of about 0.362''. A length of steel pipe 10 sufficient to produce a finished pipe of 30 ft. length is cut to length and machined at opposite ends as shown at 11 in preparation for welding an end flange in place. A hole 12 is formed in a recessed portion 13 and an evacuation tube 14 which is torch brazed in place.

At the right end (not shown) of pipe 10, a steel flange member 15 is welded on the machined portion in a position which is a mirror image of the flange member 15 shown at the left end of the pipe. Flange member 15 (at each end of the pipe) has an internal flange 16 with a tapered opening 17 and external pipe threads 18. The two flange members 15 are machined to proper dimensions prior to being welded to the machined end portions 11 to produce a finished pipe of 30 ft. length. The I.D. of pipe 10 and flanges 15 is cleaned in preparation for assembly of the double wall pipe assembly.

A tubular radiation shield and heat insulation 19 of fiber glass or the like is inserted into the steel pipe 10. A titanium pipe 20 is cut to a length slightly longer than the finished pipe and is threaded at one end as shown at 21 and thoroughly cleaned inside and out. Titanium pipe 20 has an I.D. of 1.50'' and a wall thickness of 0.068'' (which fits in the smaller I.D. of flange member 15). The unthreaded end of pipe 20 is inserted into pipe 10 through radiation shield 19 and through the tapered opening 17 in flange member 15 at the right end (not shown) of pipe 10 until the unthreaded end is flush with the end of flange member 15. A bullet nose tool (not shown) may be used to guide the titanium pipe 20 into position.

A hollow plastic buffer 22 is positioned inside the unthreaded end of pipe 20 and an explosive charge 23 and detonator 24 set in place. Detonator wires 25 extend from detonator 24 to an external power supply. The entire assembly may now be placed inside a chamber 26 and cover 27 having a seal 28 and groove 29 for passage of the detonator wires 25. Chamber 26 is evacuated to mitigate noise during the explosive welding step. The explosive charge is then fired to weld the pipe 20 to the I.D. of tapered opening 17. The explosion flares the end of pipe 20 outward to fit tightly against the I.D. of tapered opening 17 and brings the temperature and pressure to a level and for a time sufficient to fuse the titanium to the steel. The assembly is removed from the vacuum chamber 26. The eplosive connections are then removed and the partially finished pipe is cleaned, examined, and tested for integrity of the weld.

A holding nut 30 and stretching tool 31 are screwed on the threaded end 21 of titanium pipe 20. A hydraulic cylinder (not shown) or other mechanical stretching device is connected to stretching tool 31 and operated to stretch titanium tube 20 about one inch. Holding nut 30 is then tightened to engage the end of steel flange 15. This amount of stress in pipe 20 places it under a tension of about 35,000 psi. which is sufficient to prevent any buckling of the pipe 20 under normal conditions of use, e.g. 600° F. and the longitudinal load produced by weight of the pipe string. The stretch tool 31 is removed and nut 30 holds pipe 20 is its prestressed condition.

A hollow plastic buffer 22 is positioned inside the threaded, prestressed end of pipe 20 and an explosive charge 23 and detonator 24 set in place. Detonator wires 25 extend from detonator 24 to an external power supply. The entire assembly may now be placed inside a chamber 26 and cover 27 having a seal 28 and groove 29 for passage of the detonator wires 25. Chamber 26 is evacuated to mitigate noise during the explosive welding step. The explosive charge is then fired to weld the pipe 20 to the I.D. of tapered opening 17. The explosion flares the end of pipe 20 outward to fit tightly against the I.D. of tapered opening 17 and brings the temperature and pressure to a level and for a time sufficient to fuse the titanium to the steel. The assembly is removed from the vacuum chamber 26. The explosive connections are then removed and the partially finished pipe is cleaned, examined, and tested for integrity of the weld.

Stretching tool 31 is then screwed on the threaded end 21 of titanium pipe 20. The hydraulic cylinder or other mechanical stretching device is connected to stretching tool 31 and is operated to stretch titanium tube 20 sufficiently to permit holding nut 30 to be loosened and removed. The amount of stress retained in pipe 20 retains it under a tension of about 35,000 psi. The stretch tool 31 and nut 30 are then removed. The assembly is removed from the vacuum chamber 26. The explosive connections are then removed and the partially finished pipe is cleaned, examined, and tested for integrity of the weld. Excess length of titanium pipe 20 is trimmed.

Next, the annular space between pipes 10 and 20 is evacuated through hole 12 and tube 14 by means of a vacuum pump or any other suitable source of vacuum. The assembly is tested for leakage. Evacuation tube 14 is pinched off and sealed, bent into recess 13, and a steel cover plate welded in place. The pipe assembly is then cleaned and prepared for storage and/or shipment for use.

Figure 3:
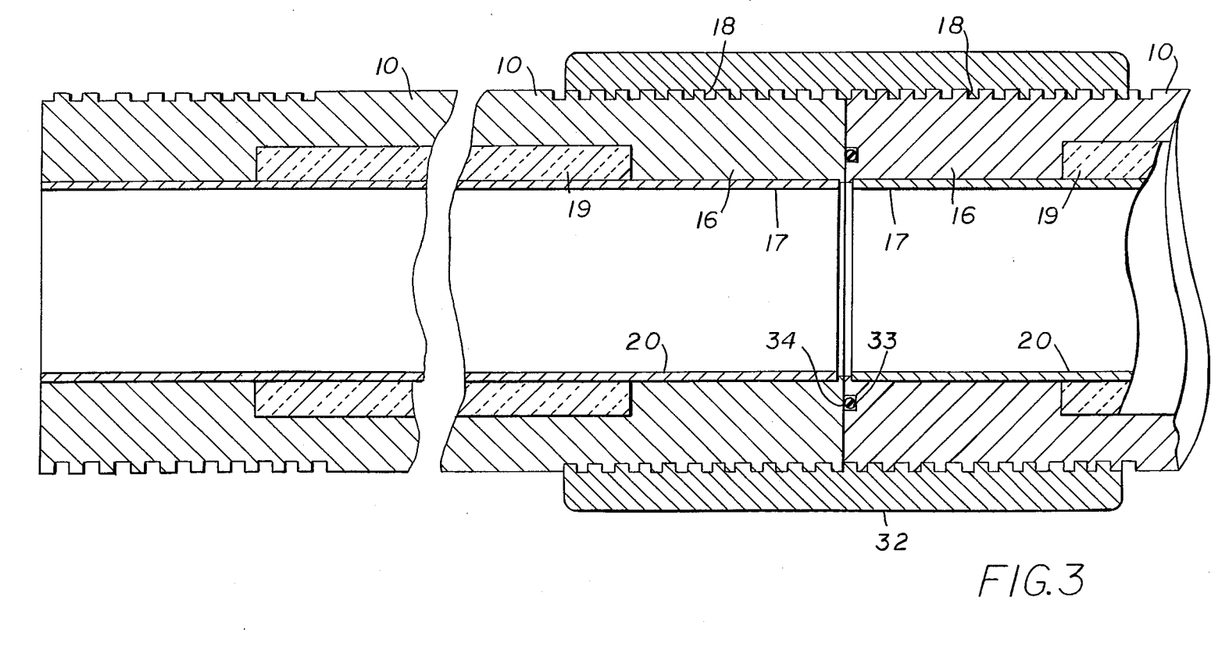
FIG. 3 is longitudinal cross section of a length of double wall pipe produced in accordance with this invention, including a coupling to an adjacent length of double wall pipe.

The coupling of two lengths of double wall pipe is shown in FIG. 3. Two lengths of double wall pipe, having a steel outer pipe 10 and a titanium inner pipe 20 and an evacuated space therebetween are prepared as described above and joined by a pipe coupling 32 having internal threads fitting the threads 18 on steel pipes 10. One of the flanges 16 has a groove 33 in an end face and a sealing O-ring or gasket 34 positioned therein to seal the joint. When the pipes are threaded tightly together in coupling 32 until the end faces of flanges 16 are sealed by compression of O-ring 34, the joint is completely sealed.

Figure 4:
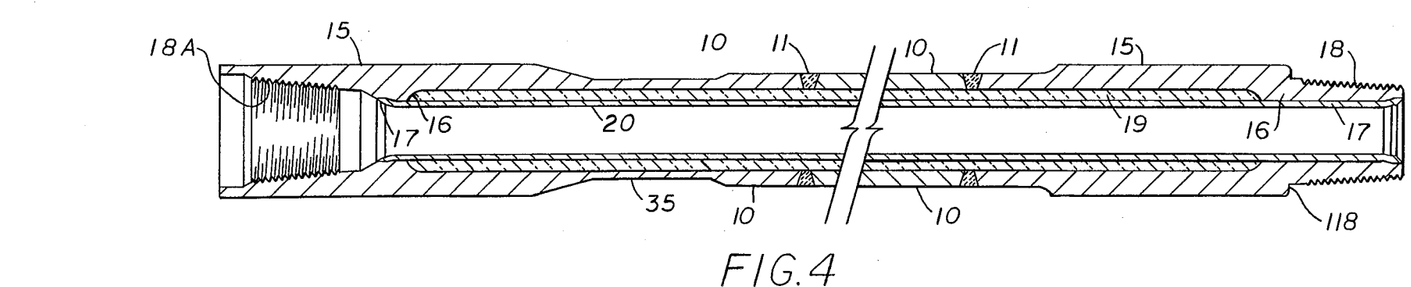
FIG. 4 is longitudinal cross section of a length of double wall pipe produced in accordance with this invention, including a titanium bayonet for coupling to an adjacent length of double wall pipe.
Figure 5:
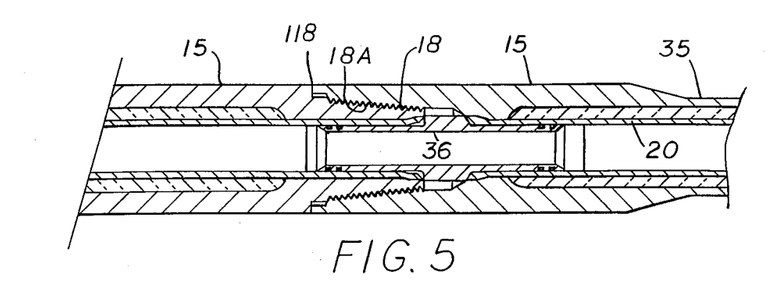
FIG. 5 is a longitudinal cross section of a coupling of a length of double wall pipe as shown in FIG. 4 to an adjacent length of double wall pipe.

In FIGS. 4 and 5, there is shown a small modification of the double wall pipe which provides a titanium surface through the joint or coupling between two abutting evacuated double wall pipes. The embodiment shown in FIGS. 4 and 5 is made be the process described above for the embodiment of FIGS. 2 and 3 but illustrates the preparation of double wall pipe having a pin thread 18 at one end with a shoulder 118 and having a box thread 18a at the other end. In addition, the outer pipe 10 has a recessed portion 35 at one end for receiving lifting tool or elevator for the pipe. When two of the evacuated double wall pipes are screwed together, as shown in FIG. 5, the end of pipe 10 at the box thread 18a abuts the shoulder 118 of the other pipe 10 at the pin thread 18. A tubular bayonet member 36 is inserted in the ends of the inner titanium pipes 20 at the joint or coupling and has an enlarged portion which seals against the outer end of the flange 16 at the box thread end.

DESCRIPTION OF ANOTHER EMBODIMENT

The double wall pipes shown in FIGS. 2-5 are structurally self supporting in use. These double wall pipes can be installed in a well bore in the earth in the same manner as a drill string but are used for conducting high temperature steam deep into the earth for heating deep formations for enhanced oil recovery. Of course, these pipes can be used for other systems which transport hot or cold fluids and require the highly efficient insulation provided by the evacuated annulus in the pipe. In either application, the pipes are structurally load bearing and require the heavier wall thickness of the outer steel pipes 10.

Figure 6:
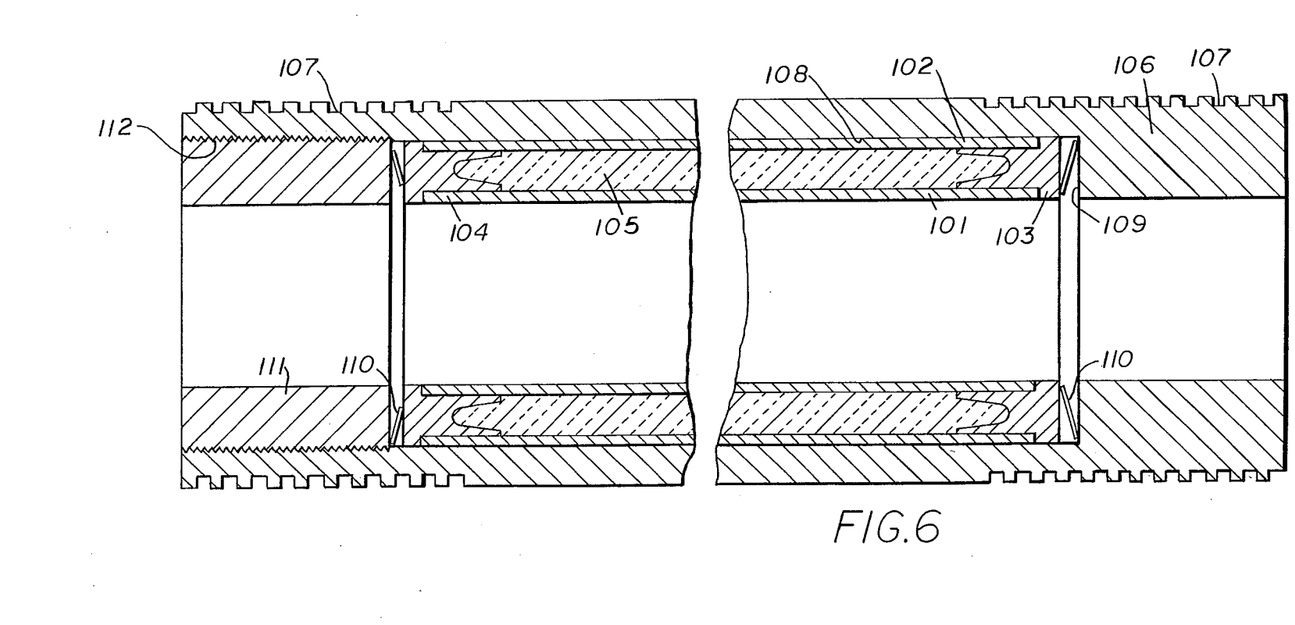
FIG. 6 is longitudinal cross section of a length of double wall pipe, produced in accordance with another embodiment of this invention, which is not a load-bearing pipe, shown installed in a length of supporting pipe as an insert.

In FIG. 6, there is shown a another embodiment of an evacuated double wall pipe which is not self-supporting and is supported inside a separate supporting pipe. In this embodiment, the double wall pipe comprises a thin wall inner titanium pipe 101 and a thin wall outer titanium pipe 102 which are fitted together with an annulus therebetween. Spacer rings 103 and 104 are positioned in opposite ends of the annulus and a tubular radiation shield or insulation 105 is positioned therebetween. Since the double wall pipe is not intended to be self-supporting, the inner pipe 101 does not have to be prestressed, as in the embodiment of FIGS. 2-5. In assembling this double wall pipe, end ring 103 (which may be of steel) is brazed to pipes 101 and 103, and the radiation shield 105 placed in the annulus. The other end ring 104 is placed in the other end of the pipes 101 and 102 and the assembly placed inside a vacuum chamber where the annulus between the pipes is evacuated and the pipes brazed to the end ring.

The sections of thin-wall, evacuated, double wall pipe is preferably formed in relatively short sections which are assembled longitudinally inside structurally supporting steel pipe 106. The pipe 106 is about 30 ft. long and has male pipe threads 107 at opposite ends. Pipe 106 has a counterbore 108 leading to a shoulder 109 in which the sections of double wall pipe are positioned. A Belleville spring washer 110 is positioned at each end of the double wall pipe to secure the pipe in place and allow for thermal growth or expansion. A retaining nut 111 is threaded in the female threaded end 112 of pipe 106 to secure the double wall pipe tightly in place.

While this invention has been shown fully and completely with special emphasis on certain preferred embodiments, it should be understood that within the scope of the appended claims the invention may be practiced otherwise than as specifically described herein.

We claim:

1. A method of producing evacuated, double wall pipe for use in transporting hot or cold fluids which comprises
    providing a first pipe of predetermined larger diameter and a second pipe having an O.D. substantially smaller than the I.D. of the first pipe,
    forming an evacuation opening in said first pipe,
    inserting said second pipe inside said first pipe with an annular space therebetween,
    welding said pipes together at one end,
    securing a stretching tool to the other end of said second pipe,
    prestressing said second pipe mechanically with said stretching tool an amount sufficient to prevent substantial buckling of said second pipe when said double wall pipe is used at elevated temperatures,
    welding the other end of said first pipe and said prestressed second pipe together without the introduction of mechanical spacers between the pipes,
    evacuating the annulus between said pipes through said evacuation opening, and
    sealing said evacuation opening.
2. A method according to claim 1 in which
    said double wall pipe is cut to finished length after said second named welding step.
3. A method according to claim 1 in which
    a non-load bearing insulating material is inserted in the annular space between said first and said second pipes.
4. A method according to claim 1 in which
    said second pipe is prestressed mechanically with said stretching tool an amount sufficient to prevent any buckling of said second pipe when said double wall pipe is used at elevated temperatures.
5. An evacuated, double-wall pipe produced according to claim 4.
6. A method according to claim 1 in which
    said second pipe is prestressed mechanically with said stretching tool an amount sufficient to prevent any buckling of said second pipe under operating conditions for said double wall pipe.
7. A method according to claim 1 in which
    said second pipe is thin walled and non-load-bearing longitudinally and said first pipe is of a diameter and wall thickness sufficient to support the prestressed second pipe.
8. A method according to claim 1 in which
    one of said pipes is of steel.
9. An evacuated, double-wall pipe produced according to claim 8.
10. A method according to claim 1 in which
    one of said pipes is of titanium.
11. An evacuated, double-wall pipe produced according to claim 10.
12. A method according to claim 1 in which one of said pipes is of steel and the other one of said pipes is of titanium.

13. A method according to claim 12 in which
the inner one of said pipes is of titanium.

14. A method according to claim 1 in which
said pipes are welded by explosion welding.

15. An evacuated, double-wall pipe produced according to claim 14.

16. A method according to claim 1 in which
said pipes are of a size and wall thickness sufficient for said double wall pipe to be structurally load bearing.

17. An evacuated, double-wall pipe produced according to claim 16.

18. A method according to claim 1 in which
a non-load bearing insulating material is inserted in the annular space between said first and said second pipes, and
said double wall pipe is cut to finished length after said second named welding step.

19. A method according to claim 1 in which
said second pipe is prestressed mechanically with said stretching tool an amount sufficient to prevent any buckling of said second pipe under operating conditions for said double wall pipe,
one of said pipes is of steel and the other one of said pipes is of titanium, and
said pipes are welded by explosion welding.

20. A method according to claim 19 in which
said second pipe is of titanium, and
said titanium functions to getter the vacuum between the pipes.

21. A method according to claim 19 in which
said pipes are of a size and wall thickness sufficient for said double wall pipe to be structurally load bearing.

22. An evacuated, double-wall pipe produced according to claim 19.

23. An evacuated, double-wall pipe produced according to claim 1.

24. A method of producing evacuated, double wall pipe for use in transporting hot or cold fluids which comprises
providing a first pipe of predetermined diameter and a second pipe having an O.D. substantially smaller than the I.D. of the first pipe,
said pipes being of a size and wall thickness insufficient for said double wall pipe to be structurally load bearing,
forming an evacuation opening in said first pipe,
providing a tubular insulation and radiation shield and inserting same inside said first pipe,
inserting said second pipe inside said first pipe inside said tubular insulation and radiation shield,
welding said pipes together at one end,
evacuating the annulus between said pipes through said evacuation opening,
welding the other end of said pipes together without the introduction of mechanical spacers between the pipes,
sealing said evacuation opening,
providing a third pipe of predetermined diameter having an I.D. slightly larger than the O.D. of said first pipe, of a load-bearing size, and
positioning said double wall pipe with a sliding fit inside said third pipe and securing the same in place.

25. An evacuated, double-wall pipe produced according to claim 24.

26. A method of producing evacuated, double wall pipe for use in transporting hot or cold fluids which comprises
providing a first steel pipe of predetermined diameter and a second titanium pipe having an O.D. substantially smaller than the I.D. of the first pipe,
cutting said steel pipe to length and forming an evacuation opening therein,
providing an evacuation tube and brazing said tube to said steel pipe at said evacuation opening,
providing steel end flanges and machining same to dimension,
welding said end flanges to the ends of said steel pipe,
providing a tubular insulation and radiation shield and inserting same inside said steel pipe,
cutting said titanium pipe to length and threading one end thereof,
cleaning said titanium pipe inside and out,
inserting said titanium pipe to a selected position longitudinally inside said steel pipe and within said tubular insulation and radiation shield,
providing an explosive welding charge and locating same inside the unthreaded end of said titanium pipe,
firing said explosive welding charge to weld the unthreaded end of said titanium pipe to said steel pipe,
providing a threaded stretching tool and threading same to the threaded end of said titanium pipe,
applying a longitudinal stretching force to said stretching tool to prestress said titanium pipe mechanically an amount sufficient to prevent any buckling of said titanium pipe under conditions of operation of said double wall pipe,
providing an explosive welding charge and locating same inside the prestressed, threaded end of said titanium pipe,
firing said explosive welding charge to weld the threaded end of said titanium pipe to said steel pipe,
cutting off any excess titanium pipe,
evacuating the annulus between said pipes through said evacuation tube and opening, and
sealing said evacuation tube and opening.

27. A method according to claim 26 in which
said annular space between said pipes is evacuated during each of the explosion welding steps.

28. A method according to claim 27 in which
said each of said explosion-welded joints is tested for leakage before use.

29. An evacuated, double-wall pipe produced according to claim 28.

30. A method according to claim 27 in which said pipes are of a size and thickness sufficient for said double wall pipe to be structurally load bearing.

31. An evacuated, double-wall pipe produced according to claim 30.

32. A method according to claim 27 in which
said pipes are of a size and wall thickness insufficient for said double wall pipe to be structurally load bearing, and said double wall pipe is positioned with a sliding fit inside a third pipe of a load-bearing size.

33. An evacuated, double-wall pipe produced according to claim 32.

34. An evacuated, double-wall pipe produced according to claim 27.

35. An evacuated, double-wall pipe produced according to claim 26.

* * * * *